United States Patent
Inoue et al.

(10) Patent No.: US 12,032,425 B2
(45) Date of Patent: Jul. 9, 2024

(54) DATA PROCESSING APPARATUS, DATA PROCESSING METHOD, AND DATA PROCESSING PROGRAM

(71) Applicant: Nippon Telegraph and Telephone Corporation, Tokyo (JP)

(72) Inventors: Yasuhiko Inoue, Musashino (JP); Shoko Shinohara, Musashino (JP); Kengo Nagata, Musashino (JP); Yusuke Asai, Musashino (JP); Akira Kishida, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 67 days.

(21) Appl. No.: 17/791,607

(22) PCT Filed: Jan. 10, 2020

(86) PCT No.: PCT/JP2020/000672
§ 371 (c)(1),
(2) Date: Jul. 8, 2022

(87) PCT Pub. No.: WO2021/140652
PCT Pub. Date: Jul. 15, 2021

(65) Prior Publication Data
US 2023/0031578 A1    Feb. 2, 2023

(51) Int. Cl.
*G06F 1/32* (2019.01)
*G06F 1/3212* (2019.01)
(Continued)

(52) U.S. Cl.
CPC ............ *G06F 1/3212* (2013.01); *G06F 1/324* (2013.01); *G06F 1/3203* (2013.01)

(58) Field of Classification Search
CPC ...... G06F 1/3212; G06F 1/324; G06F 1/3278; H04B 1/04; H04B 17/10
(Continued)

(56) References Cited

U.S. PATENT DOCUMENTS

2007/0032198 A1* 2/2007 Sakamoto ............... H04L 65/80
455/69
2007/0232255 A1* 10/2007 Masuda ................. H04B 1/385
455/343.1
(Continued)

FOREIGN PATENT DOCUMENTS

| JP | 2016116069 | 6/2016 |
|---|---|---|
| WO | WO 2012/039096 | 3/2012 |
| WO | WO 2017183479 | 10/2017 |

OTHER PUBLICATIONS

[No Author Listed] [online], "Monitoring Camera for Solar Power Generation," NTT Smile Energy, 2011, retrieved on Nov. 11, 2019, retrieved from URL <https://www.eco-megane.jp/partner/om/detail/8>, 4 pages (with English Translation).
(Continued)

*Primary Examiner* — Volvick Derose
(74) *Attorney, Agent, or Firm* — Fish & Richardson P.C.

(57) ABSTRACT

A data processing apparatus (14) according to an embodiment includes a data processing unit (105) and a wireless unit (104). The wireless unit receives the data converted by the data processing unit and wirelessly transmits the input data to an access point. The data processing unit converts, when a remaining amount input from a battery (12) is in a first state, the input data with a first setting and outputs the converted data to the wireless unit. The data processing unit converts, when the remaining amount of the battery is in a second state different from the first state, the input data with a second setting and outputs the converted data to the wireless unit. A capacity per unit time of the data after
(Continued)

conversion is different between the first setting and the second setting.

7 Claims, 8 Drawing Sheets

(51) Int. Cl.
    *G06F 1/324*     (2019.01)
    *G06F 1/3203*     (2019.01)

(58) Field of Classification Search
    USPC .......................................................... 713/320
    See application file for complete search history.

(56) References Cited

U.S. PATENT DOCUMENTS

| | | | | |
|---|---|---|---|---|
| 2010/0118180 | A1* | 5/2010 | Matsushita | H04N 23/651 |
| | | | | 348/372 |
| 2010/0283582 | A1* | 11/2010 | Fujita | H04N 1/00899 |
| | | | | 340/7.37 |
| 2015/0065201 | A1* | 3/2015 | Lee | H04W 52/027 |
| | | | | 455/566 |
| 2015/0089260 | A1* | 3/2015 | Tsutsui | G06F 1/324 |
| | | | | 713/320 |
| 2019/0065732 | A1* | 2/2019 | Woo | G06F 1/3287 |
| 2019/0132589 | A1 | 5/2019 | Chida et al. | |
| 2021/0136301 | A1* | 5/2021 | Koizumi | H04N 25/40 |
| 2022/0407337 | A1* | 12/2022 | Wang | H02J 7/0047 |
| 2023/0319397 | A1* | 10/2023 | Ishikawa | H04N 23/651 |
| | | | | 348/333.13 |
| 2023/0333675 | A1* | 10/2023 | Shimizu | G06F 3/0362 |

OTHER PUBLICATIONS

[No Author Listed] [online], "Solar Security Camera KSP-75A-CAM Construction Plan," Tokai Security Co., Ltd., Jun. 2019, retrieved on Nov. 11, 2019, retrieved from URL <http://www.tokaisecurity.net/html/solarcameradownloadpage.html>, 12 pages (with English Translation).

* cited by examiner

DATA PROCESSING APPARATUS, DATA PROCESSING METHOD, AND DATA PROCESSING PROGRAM

CROSS-REFERENCE TO RELATED APPLICATIONS

This application is a National Stage application under 35 U.S.C. § 371 of International Application No. PCT/JP2020/000672, having an International Filing Date of Jan. 10, 2020, the disclosure of which is considered part of the disclosure of this application, and is incorporated in its entirety into this application.

TECHNICAL FIELD

An embodiment of the present disclosure relates to a data processing apparatus, a data processing method, and a data processing program.

BACKGROUND ART

A wireless local area network (LAN) is known as a wireless system that wirelessly connects an access point and a terminal.

CITATION LIST

Non Patent Literature

NPL 1: NTT SMILE ENERGY, "Monitoring Camera for Solar Power Generation", [Online] [Searched on Nov. 11, 2019], Internet <URL: https://www.eco-megane.jp/partner/om/detail/8>

NPL 2: Tokai Security co., Ltd., "Solar Security Camera KSP-75A-CAM Construction Plan", [Online], [Searched on Nov. 11, 2019], Internet <URL: http://www.tokaisecurity.net/html/solarcamera-downloadpage.html>

SUMMARY OF THE INVENTION

Technical Problem

The problem is to extend an operating time of a monitoring system.

Means for Solving the Problem

A data processing apparatus according to the embodiment includes a data processing unit and a wireless communication unit. The data processing unit converts input data. The wireless communication unit receives the data converted by the data processing unit and wirelessly transmits the input data to an access point. When a remaining amount of a battery input from the battery is in a first state, the data processing unit converts the input data with a first setting and outputs the converted data to the wireless communication unit. When the remaining amount of the battery is in a second state different from the first state, the data processing unit converts the input data with a second setting and outputs the converted data to the wireless communication unit. A capacity per unit time of the data after conversion is different between the first setting and the second setting.

Advantageous Effects of the Invention

A data processing method according to the embodiment can extend the operating time of the monitoring system.

DESCRIPTION OF EMBODIMENTS

Hereinafter, the embodiment will be described with reference to the drawings. The embodiment illustrates an apparatus and method for embodying the technical concept of the invention. The drawings are schematic or conceptual. The dimensions and ratios of the drawings are not necessarily the same as the actual dimensions and ratios. The technical concept of the present disclosure is not specified by the shape, structure, arrangement, etc. of components.

1-1 Configuration of Wireless System 1

Figure 1:
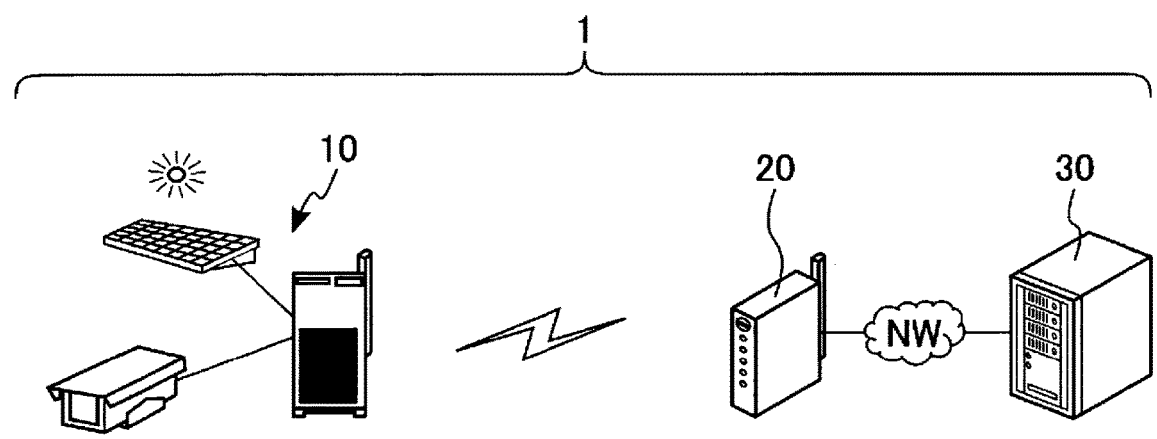
FIG. 1 is a conceptual diagram illustrating an example of an overall configuration of a wireless system according to an embodiment of the present disclosure.

A configuration of a wireless system 1 according to an embodiment of the present disclosure will be described below. FIG. 1 illustrates an example of an overall configuration of the wireless system 1 according to the embodiment. As illustrated in FIG. 1, the wireless system 1 includes a monitoring system 10, an access point 20, and a server 30.

The monitoring system 10 is installed at a location away from the access point 20 and monitors the situation in the vicinity of the installation place. The monitoring system 10 includes, for example, an apparatus capable of generating and storing power, an apparatus capable of recording video, and an apparatus capable of transmitting a wireless signal. The monitoring system 10 may be connected to the access point 20 via wireless communication and communicate with the server 30 on a network NW via the access point 20.

The base station 20 is connected to the network NW and is used as a base station for a wireless LAN. The base station 20 receives a wireless signal transmitted by the monitoring system 10. The base station 20 then transfers monitoring data based on the wireless signal received from the monitoring system 10 to the server 30 on the network NW. Communication between the base station 20 and the monitoring system 10 is based on, for example, the IEEE 802.11 standard.

The server 30 may hold various kinds of information. The server 30 is connected to the network NW and is configured to be communicable with the access point 20 via the network NW. For example, the server 30 stores the monitoring data transferred from the access point 20 via the network NW. Communication between the server 30 and the access point 20 may be wired or wireless. It suffices that the server 30 is communicable with at least the access point 20.

<1-1> Configuration of Monitoring System 10

Figure 2:
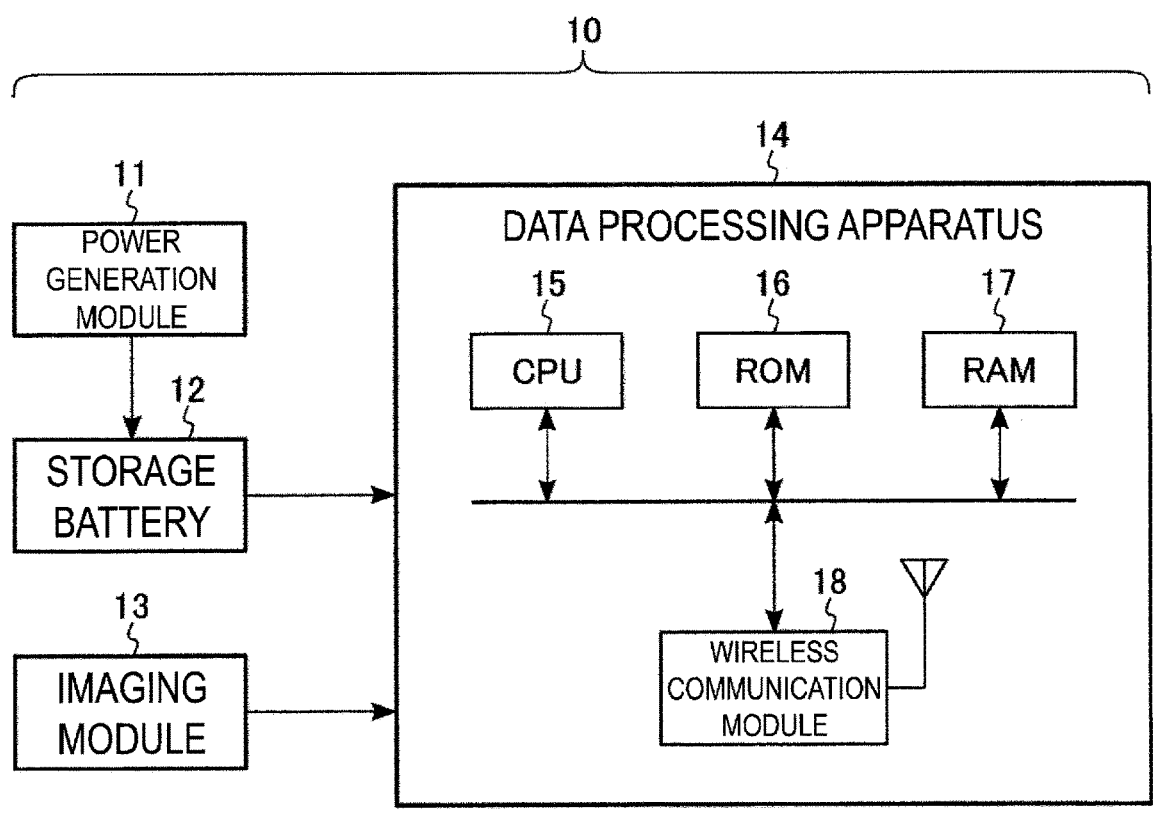
FIG. 2 is a block diagram illustrating an example of a configuration of a monitoring system included in the wireless system according to the embodiment.

FIG. 2 illustrates an example of a configuration of the monitoring system 10 included in the wireless system 1 according to the embodiment. As illustrated in FIG. 2, the monitoring system 10 includes a power generation module 11, a storage battery 12, an imaging module 13, and a data processing apparatus 14.

The power generation module 11 generates power using natural energy. As the power generation module 11, for example, a solar panel that converts solar energy into power is used. It suffices that the power generation module 11 generates power using at least natural energy, and may use heat, wind power, or the like.

The storage battery 12 stores the power generated by the power generation module 11. The storage battery 12 is used as a power source of the data processing apparatus 14. For example, the storage battery 12 supplies the power stored therein or the power generated by the power generation module 11 to the data processing apparatus 14.

The imaging module 13 records a video image to be monitored by the monitoring system 10 as electronic data. Then, the imaging module 13 outputs the recorded video data (monitoring data) to the data processing apparatus 14. The power source of the imaging module 13 may be supplied from the storage battery 12 or may be supplied from other independent power sources.

The data processing apparatus 14 has a function of converting the video data input from the imaging module 13 into compressed data, and a function of transmitting the converted video data (compressed data) as a wireless signal. It suffices that the data compression in the data processing apparatus 14 is a process of reducing the data amount of the input video data, and includes, for example, decimation of a frame constituting the video data, reduction of the data amount in the frame, and other generally used methods of reducing the data amount. In addition, the data processing apparatus 14 includes a central processing unit (CPU) 15, a read only memory (ROM) 16, a random access memory (RAM) 17, and a wireless communication module 18.

The CPU15 is a circuit capable of executing various programs, and controls the overall operation of the data processing apparatus 14. The ROM 16 is a non-volatile semiconductor memory, and holds programs, control data, and the like for controlling the data processing apparatus 14. The RAM 17 is, for example, a volatile semiconductor memory, and is used as a work area of the CPU 15. The wireless communication module 18 is a circuit used for transmission and reception of data by a wireless signal, and is connected to an antenna.

1-2> Configuration of Access Point 20

Figure 3:
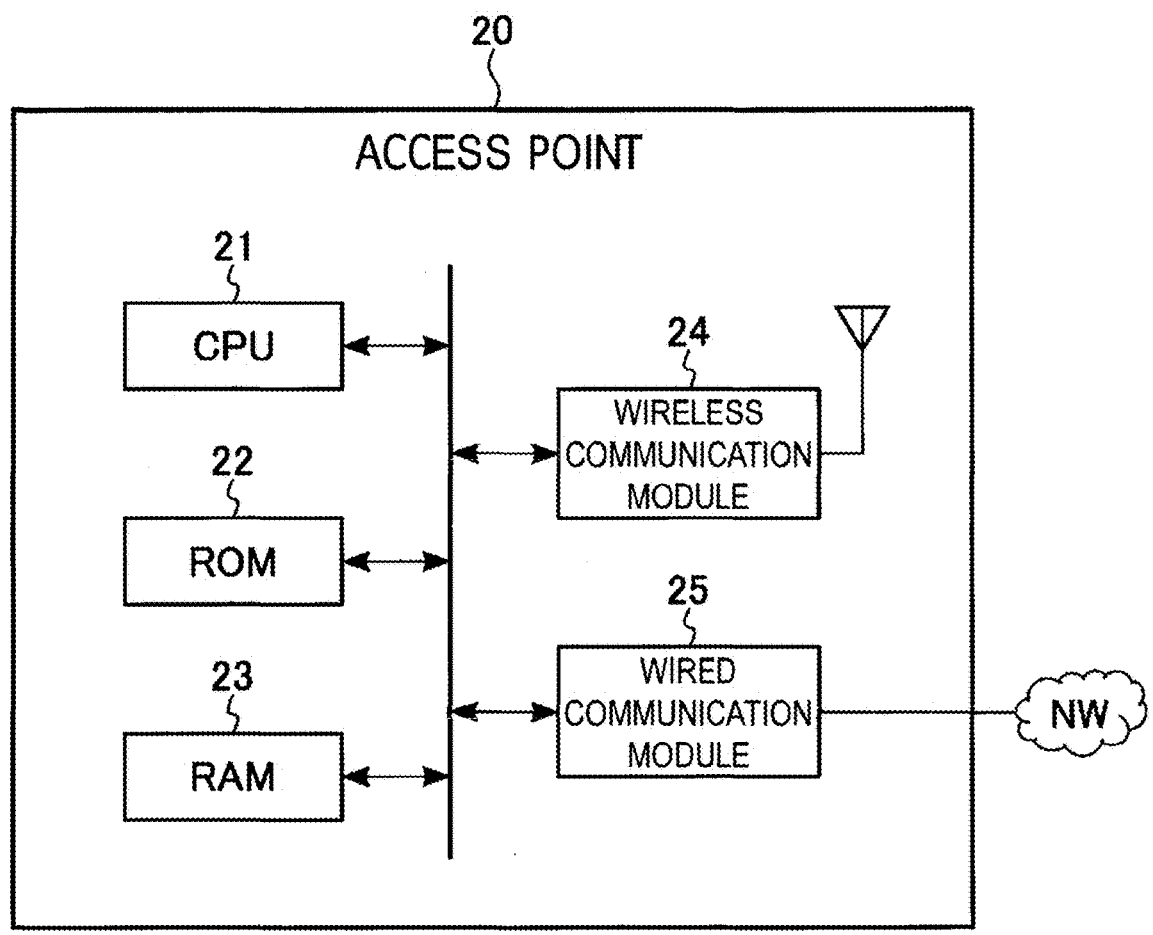
FIG. 3 is a block diagram illustrating an example of a configuration of an access point included in the wireless system according to the embodiment.

FIG. 3 illustrates an example of a configuration of the 20 included in the wireless system 1 according to the embodiment. As illustrated in FIG. 3, the access point 20 includes a CPU 21, a ROM 22, a RAM 23, a wireless communication module 24, and a wired communication module 25.

The CPU 21 is a circuit capable of executing various programs, and controls the overall operation of the access point 20. The ROM 22 is a non-volatile semiconductor memory, and holds programs, control data, and the like for controlling the access point 20. The RAM 23 is, for example, a volatile semiconductor memory, and is used as a work area of the CPU 21. The wireless communication module 24 is a circuit used for transmission and reception of data by a wireless signal, and is connected to an antenna. The wired communication module 25 is a circuit used for transmission and reception of data by a wired signal, and is connected to the network NW.

<2> Operation

In the wireless system 1 according to the embodiment, the monitoring system 10 changes the capacity per unit time of the monitoring data transmitted to the access point 20 according to the remaining amount of the storage battery 12. Hereinafter, an operation of the monitoring system 10 in the wireless system 1 according to the embodiment will be described. In the following description, it is assumed that the monitoring system 10 belongs to the access point 20.

Figure 4:
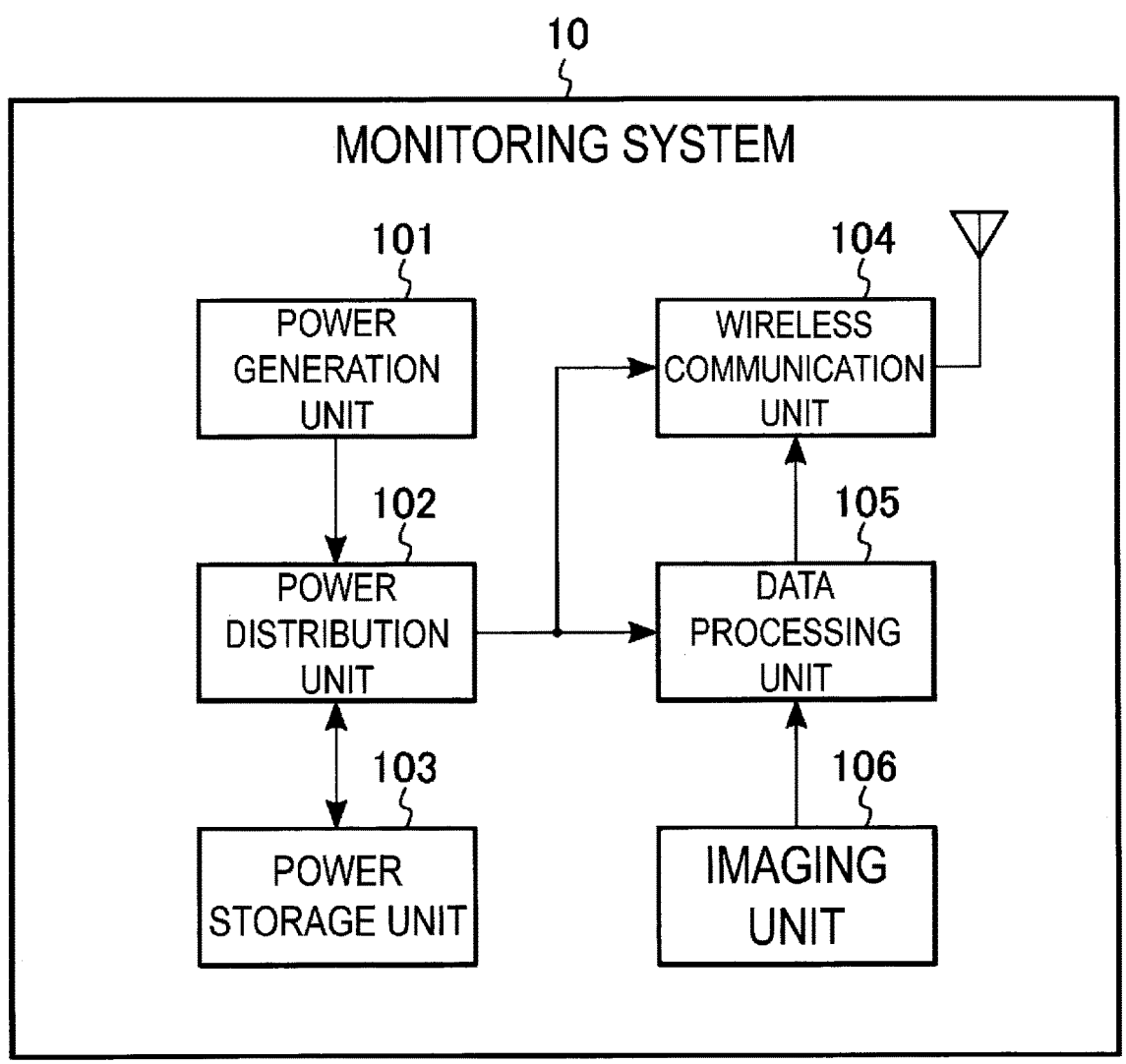
FIG. 4 is a block diagram illustrating an example of a function of the monitoring system included in the wireless system according to the embodiment.

FIG. 4 illustrates an example of a function during the operation of the monitoring system 10. As illustrated in FIG. 4, the monitoring system 10 may function as, for example, a power generation unit 101, a power distribution unit 102, a power storage unit 103, a wireless communication unit 104, a data processing unit 105, and an imaging unit 106.

The power generation unit 101 is a function corresponding to the power generation module 11. The power generation unit 101 converts natural energy into power. For example, the power generation unit 101 generates power by using energy of sunlight applied to the power generation module 11, and supplies the generated power to the power distribution unit 102.

The power distribution unit 102 is a function corresponding to the storage battery 12. The power distribution unit 102 supplies power supplied from at least one of the power generation unit 101 and the power storage unit 103 to the wireless communication unit 104 and the data processing unit 105. In addition, the power distribution unit 102 outputs information regarding the remaining amount of the storage battery 12 (hereinafter, referred to as "remaining amount information") to the data processing unit 105. The remaining amount information may be sequentially notified by the power storage unit 103 and transferred to the data processing unit 105 via the power distribution unit 102.

The power storage unit 103 is a function corresponding to the storage battery 12. The power storage unit 103 stores a surplus of power when the power supplied from the power generation unit 101 to the power distribution unit 102 is larger than the power necessary for the operation of the data processing apparatus 14 (when the power is surplus). On the other hand, when the power supplied from the power generation unit 101 to the power distribution unit 102 is smaller than the power necessary for the operation of the data processing apparatus 14 (when the power is insufficient), the power storage unit 103 supplies a shortage of the power to the power distribution unit 102. The power storage unit 103 may store all of the power generated by the power generation unit 101 and then supply power to the data processing apparatus 14. In this case, all the power necessary for the operation of the data processing apparatus 14 is supplied from the power storage unit 103 via the power distribution unit 102.

The wireless communication unit 104 is a function corresponding to the wireless communication module 18 of the data processing apparatus 14. The wireless communication unit 104 converts, for example, data input by the data processing unit 105 into a wireless signal and transmits the wireless signal via an antenna. Then, the transmitted wireless signal is received by, for example, the access point 20.

The data processing unit 105 is a function corresponding to the CPU 15 or the like of the data processing apparatus 14. For example, the data processing unit 105 converts (compresses) data such as video input by the imaging unit 106 into a predetermined data format. The data processing unit 105 may change the coding rate, the frame rate, and the like in the conversion of the video data. In addition, the data processing unit 105 may change the setting used for conversion of the video data based on the remaining amount information input from the power distribution unit 102.

The imaging unit 106 is a function corresponding to the imaging module 13. The imaging unit 106 inputs data such as an imaged video to the data processing unit 105. For example, an imaging parameter applied to the imaging unit 106 is set in advance by a user.

Figure 5:
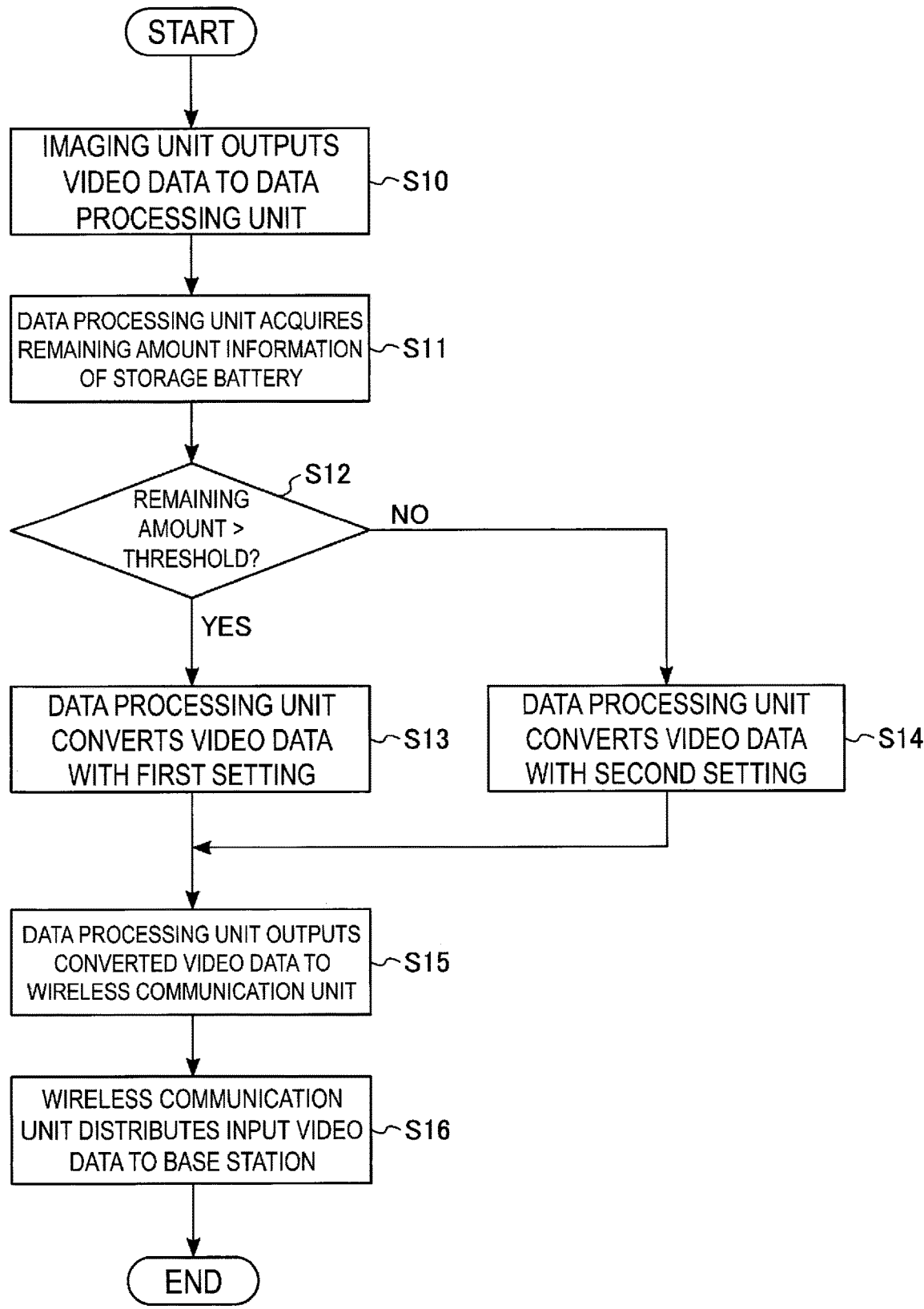
FIG. 5 is a flowchart illustrating an example of an operation of the monitoring system included in the wireless system according to the embodiment.

FIG. 5 is a flowchart illustrating an example of the operation of the monitoring system 10 included in the wireless system 1 according to the embodiment. Hereinafter, an example of an operation flow of the monitoring system 10 included in the wireless system 1 according to the embodiment will be described with reference to FIG. 5.

First, the imaging unit 106 outputs the imaged video data to the data processing unit 105 (step S10). This video data corresponds to, for example, raw data of the imaging module 13.

Next, the data processing unit 105 acquires remaining amount information of the power storage unit 103 (step S11). Specifically, the power distribution unit 102 generates the remaining amount information based on the remaining amount of the power storage unit 103, and the generated remaining amount information is referred to by the data processing unit 105. At this time, the data processing unit 105 may grasp the remaining amount of the power storage unit 103 based on the voltage value of the power supplied from the power distribution unit 102.

Then, the data processing unit 105 compares the remaining amount information of the power storage unit 103 with a threshold of the remaining amount which is set in advance. Specifically, the data processing unit 105 confirms whether the remaining amount of the power storage unit 103 exceeds the threshold (step S12). This threshold may be set by a user or may be preset at the time of shipment of the data processing apparatus 14.

When the remaining amount exceeds the threshold (YES in step S12), the data processing unit 105 converts (compresses) the video data with the first setting (step S13). On the other hand, when the remaining amount does not exceed the threshold (NO in Step S12), the data processing unit 105 converts (compresses) the video data with the second setting different from the first setting (step S14).

After the process of step S13 or S14 is executed, the data processing unit 105 outputs the converted video data to the wireless communication unit 104 (step S15). Then, the wireless communication unit 104 converts the input video data into a wireless signal and transmits the converted wireless signal to the access point 20 via an antenna (step S16).

As described above, the monitoring system 10 transmits the imaged video data to the access point 20. The transmitted wireless signal is decoded by the access point 20. Then, the access point 20 transfers the video data obtained by the decoding to the server 30 via the network NW. Then, the server 30 causes the transferred video data to be stored in a built-in storage.

For example, when the first setting is applied, that is, when the remaining amount of the power storage unit 103 exceeds the threshold, the monitoring system 10 outputs the video data amount without reducing the video data amount. On the other hand, when the second setting is applied, that is, when the remaining amount of the power storage unit 103 is smaller than the threshold, the monitoring system 10 reduces the video data amount and outputs the reduced video data amount.

When each setting is applied, the video data amount may be reduced in any case, and the second setting may be set to have a higher reduction rate of the video data than the first setting. Examples of the method for increasing the reduction rate of the video data include increasing the compression rate of the video data. In addition, compression using common scalable coding may be applied in the first setting and the second setting. In this case, for example, a setting may be applied in which, as the amount of data to be transmitted, only a base layer is transmitted in the second setting and the base layer and an enhancement layer are transmitted in the first setting.

Figure 6:
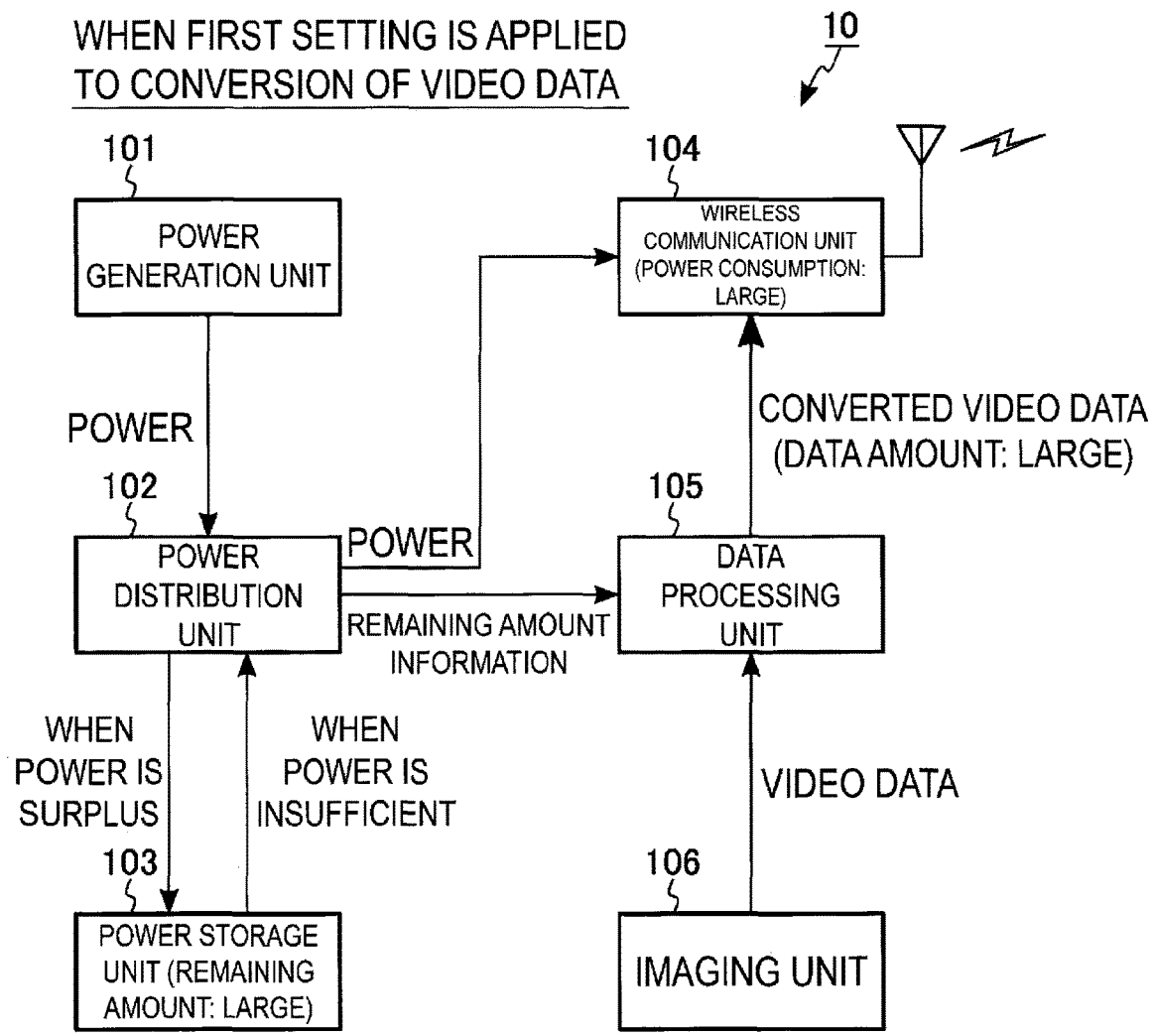
FIG. 6 is a conceptual diagram illustrating a specific example of the operation of the monitoring system included in the wireless system according to the embodiment.
Figure 7:
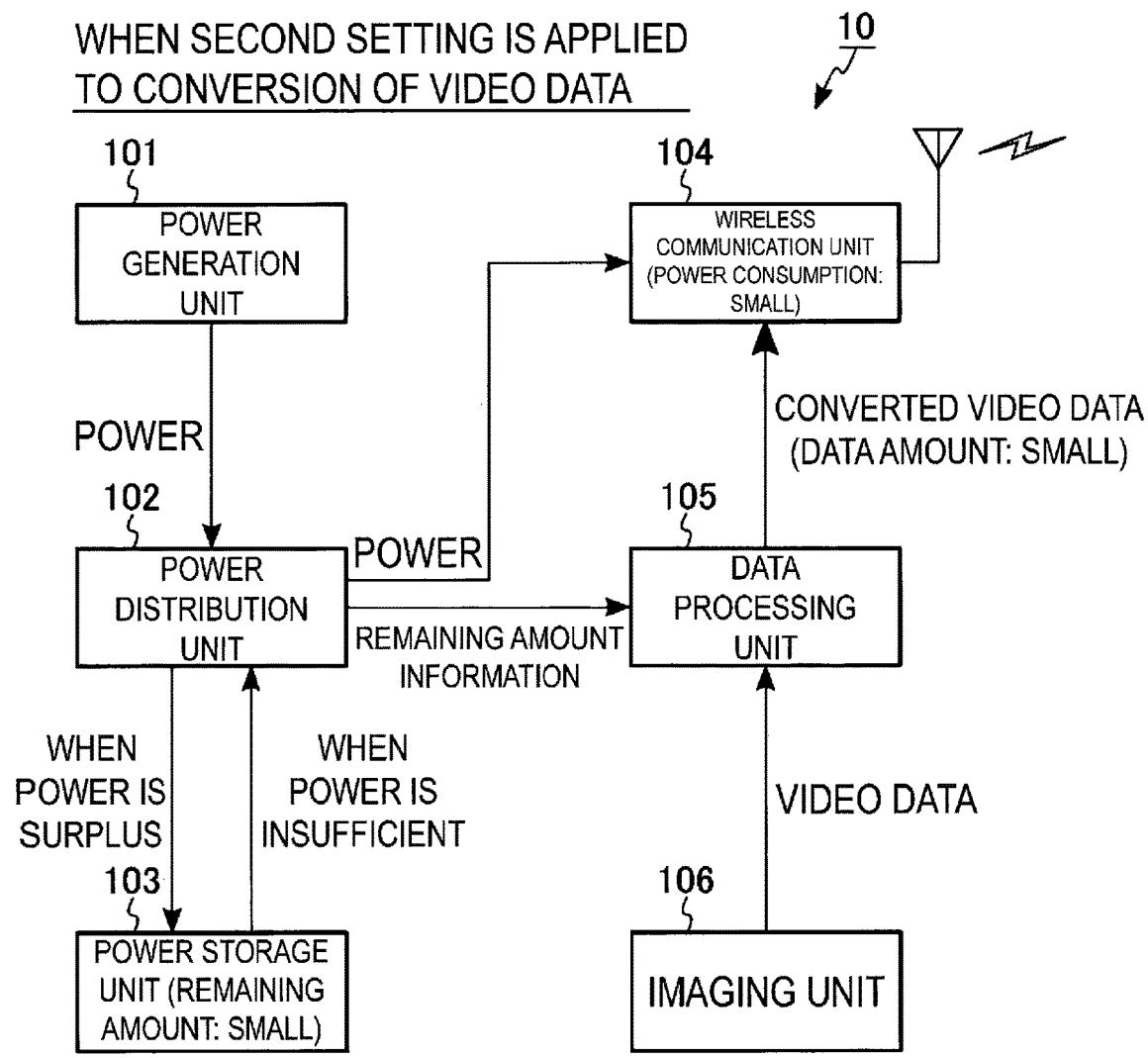
FIG. 7 is a conceptual diagram illustrating a specific example of the operation of the monitoring system included in the wireless system according to the embodiment.

Each of FIGS. 6 and 7 illustrates a specific example of the operation of the monitoring system 10 included in the wireless system 1 according to the embodiment. FIG. 6 corresponds to an example of the operation when the first setting is applied to the conversion of the video data. FIG. 7 corresponds to an example of the operation when the second setting is applied to the conversion of the video data.

As illustrated in FIG. 6, when the remaining amount of the power storage unit 103 is large, the first setting is applied to the conversion of the video data. In the first setting, the data processing unit 105 converts the video data with, for example, a high image quality setting. In the high image quality setting, for example, a high coding rate is applied, and the frame rate of the input video data is maintained. The video data with the high image quality setting has a large data amount per unit time. Therefore, when the first setting is applied, the power consumption of the wireless communication unit 104 increases as the amount of data to be transmitted increases.

As illustrated in FIG. 7, when the remaining amount of the power storage unit 103 is small, the second setting is applied to the conversion of the video data. In the second setting, the data processing unit 105 converts the video data with, for example, a low image quality setting. In the low image quality setting, for example, a low coding rate is applied, and the frame rate of the input video data is reduced. In other words, a part of the frame of the input video data is decimated, that is, periodically deleted. The video data with the low image quality setting has a smaller data amount per unit time than the video data with the high image quality setting. Therefore, when the second setting is applied, the power consumption of the wireless communication unit 104 decreases as the amount of data to be transmitted is smaller than that in the case of the first setting.

<3> Effects of Embodiment

According to the data processing apparatus 14 included in the monitoring system 10 included in the wireless system 1 according to the embodiment described above, the operating time of the monitoring system 10 can be extended. Hereinafter, the detailed effects of the data processing apparatus 14 in the embodiment will be described.

As a system for constructing a monitoring environment, a monitoring system using a wireless LAN capable of performing communication over a long distance with low power consumption is considered. Specifically, the monitoring system wirelessly transmits monitoring data acquired by an imaging module such as a video camera to the access point. Then, the access point transfers the received monitoring data to the server, and the server accumulates the monitoring data.

As a result, a user can provide a monitoring service or the like based on the monitoring data accumulated in the server. In addition, a user can easily construct a wide range of monitoring environment only by preparing the monitoring system and the access point. Such a monitoring system preferably operates in an autonomous state by using a combination of a power generation module and a storage battery as a power source.

However, it is difficult for a power generation module using natural energy to stably supply power to a storage battery. For example, when a solar panel using solar energy is used as a power generation module, the amount of power generated by the power generation module changes according to weather near the monitoring system.

For example, when a period during which it is difficult to generate power becomes long, the monitoring system comes into a state of operating using only power of the storage battery. In this state, the remaining operating time of the monitoring system is determined according to the remaining amount of the storage battery. When the remaining amount of the storage battery runs out, the monitoring system cannot continue the monitoring. Interruption of continuous recording of monitoring data may lead to deterioration in quality of monitoring service and security.

Therefore, the monitoring system 10 in the embodiment changes the amount of data to be transmitted to the access point according to the remaining amount of the storage battery 12. In brief, the data processing apparatus 14 included in the monitoring system 10 changes, based on the remaining amount information of the storage battery 12, the setting applied to the conversion of the raw data of the video acquired by the imaging module 13.

For example, the data processing apparatus 14 converts the raw data with the high image quality setting when the remaining amount of the storage battery 12 is large, and converts the raw data with the low image quality setting when the remaining amount of the storage battery 12 is small. The data capacity per unit time is smaller in the low image quality setting than in the high image quality setting. In addition, the power consumption of the wireless communication module 18 changes according to the capacity of data to be transmitted. That is, the data processing apparatus 14 in the embodiment can reduce the power consumption of the wireless communication module 14 in response to a decrease in the remaining amount of the storage battery 12.

As a result, the data processing apparatus 14 in the embodiment can extend the time until the transmission of the monitoring data is stopped under the condition that the data processing apparatus 14 is operated only with the storage battery 12. In other words, the data processing apparatus 14 in the embodiment can extend the operating time of the monitoring system 10 when only the power of the storage battery 12 is used. Therefore, the data processing apparatus 14 in the embodiment can reduce the possibility that the recording of the monitoring data is interrupted, and can suppress deterioration in quality of the monitoring service and security using the monitoring system 10.

In addition, in the embodiment, the case where the setting for suppressing the power consumption of the data processing apparatus 14 according to the remaining amount of the storage battery 12 is used has been exemplified, but the present invention is not limited to the example. For example, the data processing apparatus 14 may convert the monitoring data into the video data of higher quality when the remaining amount of the storage battery 12 exceeds a predetermined threshold and the power supply by the power generation module 11 is sufficient. It suffices that the data processing apparatus 14 changes the setting used for conversion of the monitoring data according to at least the state of the supplied power.

For example, the data processing apparatus 14 transmits high-definition images within a possible range in a time zone in which energy can be sufficiently used such as daytime, and suppresses the amount of data to be transmitted with emphasis on continuity in a time zone in which energy is insufficient such as nighttime. As a result, the data processing apparatus 14 can enhance an effect of monitoring data as a material for image analysis in a time zone in which energy can be sufficiently used. In this way, a user can make the monitoring service high in quality according to the situation. The condition under which the data processing unit 14 converts the monitoring data into the high-quality video data may be other conditions. This condition may be appropriately changed according to the environment in which the monitoring system 10 is used and the type of power generation module 11.

<4> Modification Example of Embodiment

In the embodiment, the case where the data processing unit 105 selectively uses the first setting and the second setting according to the remaining amount information of the power storage unit 103 has been exemplified, but the present invention is not limited thereto. For example, the data processing unit 105 may selectively use three or more settings according to the remaining amount information of the power storage unit 103.

Figure 8:
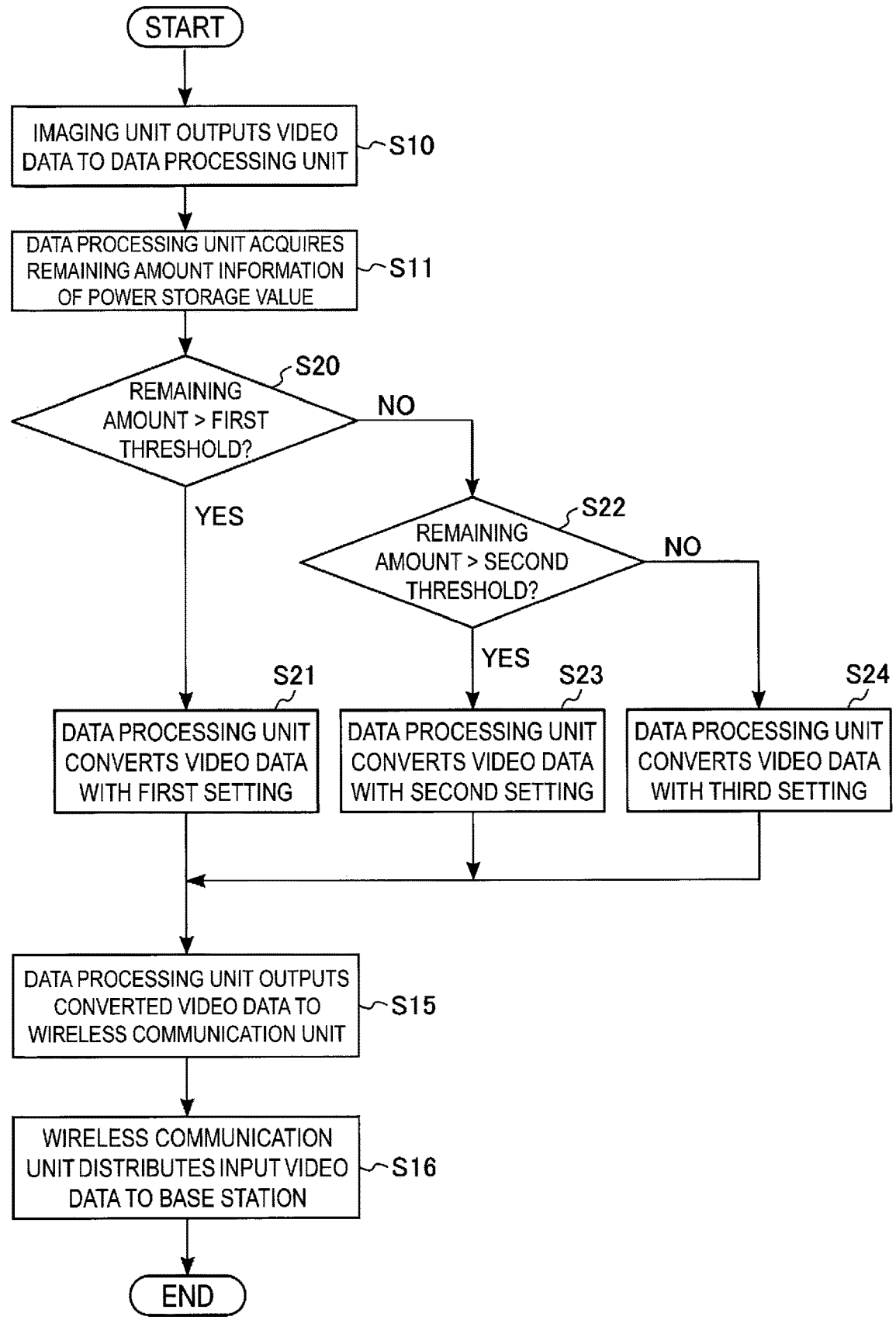
FIG. 8 is a flowchart illustrating an example of the operation of the monitoring system included in the wireless system according to a modification example of the embodiment.

FIG. 8 is a flowchart illustrating an example of the operation of the monitoring system 10 included in the wireless system 1 according to the modification of the embodiment, and illustrates an example of the operation when three settings are selectively used. Hereinafter, an example of an operation flow of the monitoring system 10 included in the wireless system 1 according to the embodiment will be described with reference to FIG. 8.

First, the processes of steps S10 and S11 are sequentially executed. In brief, the data processing unit 105 acquires raw data generated by the imaging unit 106 and the remaining amount information of the power storage unit 103. Next, the data processing unit 105 confirms whether the remaining amount of the power storage unit 103 exceeds a first threshold (step S20).

When the remaining amount exceeds the first threshold (YES in step S20), the data processing unit 105 converts the video data with the first setting (step S21). On the other hand, when the remaining amount does not exceed the first threshold (NO in Step S20), the data processing unit 105 confirms whether the remaining amount of the power storage unit 103 exceeds a second threshold (step S22). The second threshold is set to be smaller than the first threshold.

When the remaining amount exceeds the second threshold (YES in step S22), the data processing unit 105 converts the video data with the second setting different from the first setting (step S23). On the other hand, when the remaining amount does not exceed the second threshold (NO in Step S22), the data processing unit 105 converts the video data with a third setting different from each of the first setting and the second setting (step S24).

Then, after the process of any of steps S21 to S23 is executed, the processes of steps S15 and S16 are sequentially executed. In brief, the converted video data is transmitted to the access point 20 as a wireless signal.

As described above, in the modification example of the embodiment, for example, two thresholds (first and second thresholds) are used. In the modification example of the embodiment, for example, the first setting corresponds to the high image quality setting, the second setting corresponds to a medium image quality setting, and the third setting corresponds to the low image quality setting. The data amount per unit time of the video data with the medium image quality setting is set between the high image quality setting and the low image quality setting. Furthermore, when compression using common scalable coding is used, for example, only the base layer is transmitted in the first setting, the base layer and the enhancement layer (space) are transmitted in the second setting, and the base layer and the enhancement layer (space+time) are transmitted in the third setting.

As a result, in the modification example of the embodiment, the power consumption of the data processing apparatus 14 decreases in the order of the first setting, the second setting, and the third setting. As a result, the data processing apparatus 14 in the modification example of the embodiment can control the balance between the quality of the monitoring data and the operating time of the data processing apparatus 14 more finely than in the embodiment.

<5> Other Modification Examples, Etc.

The operation of the monitoring system 10 in each embodiment can be variously modified. For example, when the remaining amount is below the threshold, the data processing unit 105 may output the video data in synchronization with sleep control of the wireless communication unit 104. The wireless communication unit 104 can perform power saving operation by performing sleep control in accordance with a reception cycle of a beacon signal from the access point 20. In this case, the data processing unit 105 outputs the video data in accordance with the cycle of the sleep (that is, the cycle of receiving the beacon signal from the access point 20) from the wireless communication unit 104. This makes it possible to avoid a situation where there is no data to be transmitted even though the wireless communication unit 104 wakes up, and to improve the power saving effect. When the access point 20 periodically allocates the transmission opportunity to each wireless communication unit 104, each wireless communication unit 104 may output the video data in accordance with the allocation timing.

In the embodiment, the case where the data handled by the monitoring system 10 is the video data has been exemplified, but the present invention is not limited to the example. For example, the monitoring system 10 may only handle audio data. When the data handled by the monitoring system 10 is only audio data, the imaging unit 106 inputs the audio data to the data processing unit 105. Then, as in the embodiment, the data processing unit 105 changes the compression setting of the audio data according to the remaining amount information of the power storage unit 103. In addition, the monitoring system 10 may selectively use the setting for handling the video data and the setting for handling only the audio data according to the remaining amount information of the power storage unit 103.

In the embodiment, the case where the imaging unit 106 inputs the raw data to the data processing unit 105 has been exemplified, but data compressed by the imaging unit 106 may be input to the data processing unit 105. When compression using common scalable coding is applied, the data processing unit 105 selects, for example, up to which layer the data processing unit 105 transmits to the access point 20. It suffices that the data processing unit 105 selectively uses a plurality of types of settings according to the state of the power supply at least in the conversion process for the data input from the imaging unit 106. Then, it suffices that the capacity per unit time of the monitoring data transmitted from the wireless communication unit 104 is adjusted by selectively using a plurality of types of settings. For example, the data processing unit 105 may only execute a decimating process on uncompressed data input from the imaging unit 106. In this case, for example, the server 30 needs to have a function of developing the raw data of the imaging module 13. In addition, the data processing apparatus 14 may apply lossless compression to the conversion of the uncompressed data input from the imaging unit 106.

In the embodiment, the case where the power of the data processing apparatus 14 is supplied by a set of the power generation module 11 and the storage battery 12 has been exemplified, but the present invention is not limited to the example. For example, the power source of the data processing apparatus 14 may be a detachable primary battery or secondary battery. Also in this case, the data processing apparatus 14 can obtain effects similar to those described in the embodiment.

The configuration of the wireless system 1 according to the embodiment is merely an example, and other configurations may be employed. For example, in the monitoring system 10, each of the power generation module 11, the storage battery 12, and the imaging module 13 may be built in the data processing apparatus 14 or may be externally connected. In addition, the data processing apparatus 14 may include a storage. The storage included in the data processing apparatus 14 may store, for example, compressed video data, raw data, and the like. Then, when the remaining amount of the storage battery 12 is recovered, the monitoring system 10 may transmit the data stored in the storage to the access point 20. In this case, the server 30 that receives the data may execute replacement, combination, or the like of the received data.

The functional configuration of the monitoring system 10 in the wireless system 1 according to the embodiment is merely an example. The functional configuration of the monitoring system 10 may be another name and grouping as long as the operation described in the embodiment may be executed.

In the wireless system 1 according to the embodiment, the CPUs included in the access point 20 and the data processing apparatus 14 may be other circuits. For example, a micro processing unit (MPU) or the like may be used instead of the CPU. Furthermore, each of the processes described in the embodiment may be realized with dedicated hardware. In the wireless system 1 according to the embodiment, a process executed by software and a process executed by hardware may be mixed, or only one of them may be used.

"Connection" herein corresponds to a state in which communication of data is possible. The fact that "the monitoring system 10 belongs to the access point 20" indicates that association and authentication are completed between the data processing apparatus 14 of the monitoring system 10 and the access point 20. Each of the "association" and the "authentication" corresponds to a process for attributing the data processing apparatus 14 to the access point 20.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. The embodiment and modification thereof are included in the scope and gist of the invention and are included in the invention described in the claims and the equivalent scope thereof.

REFERENCE SIGNS LIST

1 . . . Wireless system
10 . . . Monitoring system
11 . . . Power generation module
12 . . . Storage battery
13 . . . Imaging module
14 . . . data processing apparatus
15 . . . CPU
16 . . . ROM
17 . . . RAM
18 . . . Wireless communication module
20 . . . Access point
21 . . . CPU
22 . . . ROM
23 . . . RAM
24 . . . Wireless communication module
25 . . . Wired communication module
30 . . . Server
101 . . . Power generation unit
102 . . . Power distribution unit
103 . . . Power storage unit
104 . . . Wireless communication unit
105 . . . Data processing unit
106 . . . Imaging unit

The invention claimed is:

1. A data processing apparatus, comprising:
a data processing unit configured to convert input data; and
a wireless communication unit configured to receive the data converted by the data processing unit and to wirelessly transmit the input data to an access point,
wherein the data processing unit converts, when a remaining amount input from a battery is in a first state, the input data with a first setting and outputs the converted data to the wireless communication unit, the data processing unit converts, when a remaining amount of the battery is in a second state different from the first state, the input data with a second setting and outputs the converted data to the wireless communication unit,
a capacity per unit time of the converted data is different between the first setting and the second setting, and
common scalable coding is applied to the first setting and the second setting, and an allocation of a layer to be output to the wireless communication unit differs between the first setting and the second setting.

2. The data processing apparatus according to claim 1,
wherein the remaining amount of the battery is smaller in the second state than in the first state,
the capacity per unit time of the converted data is smaller in the second setting than in the first setting,
a first layer and a second layer are output to the wireless communication unit in the first setting, and
only the first layer is output to the wireless communication unit in the second setting.

3. The data processing apparatus according to claim 1,
wherein the input data is video data, and
at least one of a frame rate and a coding rate is different between the first setting and the second setting.

4. A data processing method, comprising:
converting, when a remaining amount of a battery is in a first state, an input data with a first setting, and outputting the converted data to a wireless communication unit; and
converting, when the remaining amount of the battery is in a second state different from the first state, the input data with a second setting, and outputting the converted data to the wireless communication unit,
wherein a capacity per unit time of the converted data is different between the first setting and the second setting, and
common scalable coding is applied to the first setting and the second setting, and an allocation of a layer to be output to the wireless communication unit differs between the first setting and the second setting.

5. The data processing method according to claim 4,
wherein the remaining amount of the battery is smaller in the second state than in the first state,
the capacity per unit time of the converted data is smaller in the second setting than in the first setting,
a first layer and a second layer are output to the wireless communication unit in the first setting, and
only the first layer is output to the wireless communication unit in the second setting.

6. The data processing method according to claim 4,
wherein the input data is video data, and
at least one of a frame rate and a coding rate is different between the first setting and the second setting.

7. A non-transitory computer readable medium storing a computer program which is executed by a computer to provide the steps of:
convert, when a remaining amount of a battery is in a first state, input data with a first setting, and output the converted data to a wireless communication unit; and
convert, when the remaining amount of the battery is in a second state different from the first state, the input data with a second setting, and outputting the converted data to the wireless communication unit,
wherein a capacity per unit time of the converted data is different between the first setting and the second setting, and
common scalable coding is applied to the first setting and the second setting, and an allocation of a layer to be output to the wireless communication unit differs between the first setting and the second setting.

* * * * *